United States Patent
Novaes

(10) Patent No.: US 6,947,392 B2
(45) Date of Patent: Sep. 20, 2005

(54) METHODS AND ARRANGEMENTS FOR BUILDING A SUBSOURCE ADDRESS MULTICAST DISTRIBUTION TREE USING TRACED ROUTES

(75) Inventor: Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 09/906,936

(22) Filed: Jul. 16, 2001

(65) Prior Publication Data

US 2003/0012146 A1 Jan. 16, 2003

(51) Int. Cl.[7] .............................. H04L 12/28; H04J 3/26
(52) U.S. Cl. ...................................... 370/256; 370/432
(58) Field of Search ................................ 370/400, 432, 370/254–256, 235, 390, 351, 389; 709/238, 245

(56) References Cited

U.S. PATENT DOCUMENTS

| | | | |
|---|---|---|---|
| 6,611,872 B1 * | 8/2003 | McCanne | 709/238 |
| 2003/0026268 A1 * | 2/2003 | Navas | 370/400 |
| 2003/0202506 A1 * | 10/2003 | Perkins et al. | 370/352 |

* cited by examiner

Primary Examiner—Duc Ho
(74) Attorney, Agent, or Firm—Ference & Associates

(57) ABSTRACT

Methods and arrangements for facilitating the further development of a distribution tree among at least three nodes in a distributed network. A path is ascertained between a publisher node and a joining subscriber node, and each path between the publisher node and each existing subscriber node is also ascertained. These paths are compared and, on the basis of the comparison, the subscriber node is established as a child of another node.

13 Claims, 4 Drawing Sheets

METHODS AND ARRANGEMENTS FOR BUILDING A SUBSOURCE ADDRESS MULTICAST DISTRIBUTION TREE USING TRACED ROUTES

FIELD OF THE INVENTION

The present invention relates generally to the field of digital communications, and more particularly to packet transmission systems involved in the management of multicast communications to a plurality of users.

BACKGROUND OF THE INVENTION

In the field of communication networks, the term multicast refers to a data package switching technology in which a single data packet is received by a plurality of nodes. This mode of transmission is specially useful when several nodes in the network need to receive data packets which emanate from the same source. The multicast technology reduces the number of separate transmissions and data switching operations which are necessary to deliver a data package to a set of nodes in a communications network. The communications network contains specialized nodes which are called router nodes, or package switching nodes. Such nodes perform the package switching operation which route a given data package along the network towards a specific destination.

The multicast capability of a network is an extension of the point to point transmission infrastructure of the communications network. There are known to exist a number of network communication standards, the most prominent being the Internet Protocol (IP). Other protocols exist which are distinct to IP, such as Asynchronous Transfer Mode (ATM), or are an extension of the IP protocol. Similarly, several multicast protocols exist which implement the multicast capability which are designed for the several point to point transmission mode protocols. The most prominent of such multicast protocols are the implementations of multicast, which are integrated with the basic IP protocol. Some of these implementations have become standards, such as DVMRP and PIM, and yet others remain under discussion, such as MOSPF. (These are all currently existing multicast technologies, as defined by the IETF [Internet Engineering Task Force]. As DVMRP [Distance Vector Multicast routing Protocol] and PIM [Protocol Independent Multicast] are now standard, they are published as Internet Drafts by the IETF. As MOSPF [Multicast Open Shortest Path First Protocol] is still under discussion at the IETF, it is published as an RFC document [i.e., "Request for Comments"]. The references for these protocols are as follows: DVMRP—IETF Internet Draft; MOSPF—IETF RFC 1584; and PIM—IETF Internet Draft.)

Generally, it can be said that all the currently existing multicast protocols have one characteristic in common, which is the fact that they utilize the same addressing scheme as the underlying point to point protocol. This fact limits the addressing capability of the multicast protocol to that of the underlying point to point protocol. For example, this characteristic makes the protocols in question unsuitable in a scenario in which a data source needs to send a data package to a subset of all of its receivers. Since the number of all possible subsets of receivers of data from a given source grows exponentially with the number of receivers, conventional multicast technology tends to be inadequate for a variety of applications requiring a finer addressing capability.

Apart from the fact that each conventional multicast protocol is usually designed as an extension of the underlying point to point protocol, another important aspect of the design of existing multicast technology is that of the design and maintenance of the multicast distribution trees. A multicast distribution tree is a distributed data structure which includes a number of router nodes, a number of source nodes and a number of receiver nodes. Typically, multicast distribution trees are derived from the actual configuration of the routers of the underlying protocol. In most such protocols, two nodes in the distribution tree are only "neighbors" if they are physically connected by a communications link. In some implementations, a facility exits which allows for a human operator to create links in a multicast distribution tree between two nodes which are not physical neighbors. Such links are called multicast tunnels. The utilization of multicast tunnels has become a necessity in several applications in which users are interconnected by a communications network which does not support any form of multicast protocol. This problem is particularly serious at present, because the most widely utilized communication network is the universal Internet, which was originally derived form the DoD (Department of Defense) ARPAnet and now is the most widely used private network, which spans the entire planet and has a number of users approaching one billion.

The Internet presently only supports the IP point-to-point protocol. The Internet has been unable to support the IP multicast standard because of the sheer size of the Internet. In such a scenario, it becomes very hard to deploy a protocol which builds distribution trees efficiently. Even if this problem could be solved in the near future, another problem, the coarseness of the IP multicast addressing scheme, will still be a limitation of the multicast capability. In case the nodes in the interconnecting network do not support a protocol of choice, it will most likely be necessary to utilize protocol tunnels. The manual configuration, i.e., the construction of multicast distribution trees by human operators, becomes impractical in Internet applications.

In view of the foregoing, several needs have been recognized, among which is a need to provide multicast distribution tree technology configured for efficiently and automatically constructing a multicast distribution tree for nodes which are separated by a network which does not support the specific multicast protocol.

SUMMARY OF THE INVENTION

In accordance with at least one presently preferred embodiment of the present invention, the problem of distributing data packages to a refined set of subscriber nodes is solved by the provision of a method for organizing a network of router nodes into a distribution structure which is termed a Subsource Addressing Multicast Tree. This method is utilized to extend the addressing capabilities of a point to point network, adding to the network the capability to multicast data packages. The method utilizes a point to point trace route facility, which is preferably provided by the point to point communication network, to construct the Subgroup Addressing Multicast data distribution trees.

In summary, the present invention provides, in one aspect, a method of facilitating the further development of a distribution tree among at least three nodes in a distributed network, the method comprising the steps of: designating one of the nodes as a publisher node; designating at least one node as at least one existing subscriber node, the at least one existing subscriber node and the at least one publisher node forming an existing distribution tree; designating one of the nodes as a joining subscriber node; ascertaining a path between the publisher node and the joining subscriber node; ascertaining each path between the publisher node and each existing subscriber node; comparing the path between the publisher node and the joining subscriber node with each path between the publisher node and each existing subscriber node; and establishing the joining subscriber node as a child of another node based on the comparing step.

In another aspect, the present invention provides an apparatus for facilitating the further development of a distribution tree among at least three nodes in a distributed network, the apparatus comprising: an arrangement for designating one of the nodes as a publisher node; an arrangement for designating at least one node as at least one existing subscriber node, the at least one existing subscriber node and the at least one publisher node forming an existing distribution tree; an arrangement for designating one of the nodes as a joining subscriber node; an arrangement for ascertaining a path between the publisher node and the joining subscriber node; an arrangement for ascertaining each path between the publisher node and each existing subscriber node; an arrangement for comparing the path between the publisher node and the joining subscriber node with each path between the publisher node and each existing subscriber node; and an arrangement for establishing the joining subscriber node as a child of another node based on the comparison of paths.

Furthermore, in an additional aspect, the present invention provides a program storage device readable by machine, tangibly embodying a program of instructions executable by the machine to perform method steps for facilitating the further development of a distribution tree among at least three nodes in a distributed network, the method comprising the steps of: designating one of the nodes as a publisher node; designating at least one node as at least one existing subscriber node, the at least one existing subscriber node and the at least one publisher node forming an existing distribution tree; designating one of the nodes as a joining subscriber node; ascertaining a path between the publisher node and the joining subscriber node; ascertaining each path between the publisher node and each existing subscriber node; comparing the path between the publisher node and the joining subscriber node with each path between the publisher node and each existing subscriber node; and establishing the joining subscriber node as a child of another node based on the comparing step.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
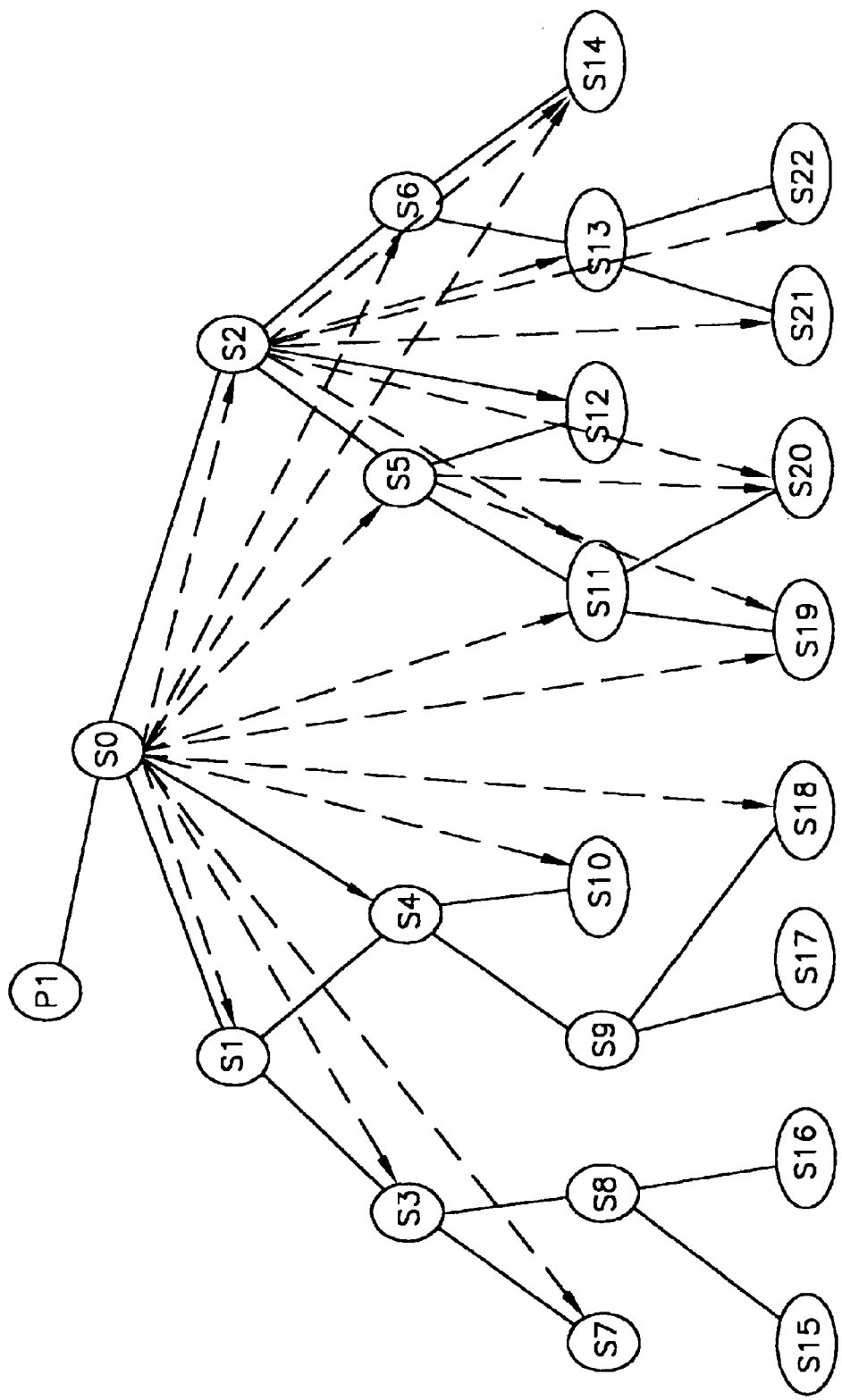
FIG. 1 schematically illustrates a distribution tree and some possible paths for data propagation.

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and application Ser. No. for each one): "Methods And Apparatus for the Propagation Of Multicast Transmissions In A Communications Network" (application Ser. No. 09/906,928); "Methods and Apparatus for Updating Subsource Addressing Multicast Routing Records in a Communications Network" application Ser. No. 09/906,597); "Methods and Arrangements for Building a Subsource Address Multicast Distribution Tree Using Point to Point Routing Records" (application Ser. No. 09/906,937); "Methods and Arrangements for Building a Subsource Address Multicast Distribution Tree Using Network Bandwidth Estimates" (application Ser. No. 09/906,939); "Methods and Arrangements for Dynamically Modifying Subsource Address Multicast Data Distribution Trees" (application Ser. No. 09/906,596); "Methods and Arrangements for Monitoring Subsource Addressing Multicast Distribution Trees" (application Ser. No. 09/906,593); "Methods and Arrangements for Establishing a Group Collaboration Session Utilizing Multiple Multicast Distribution Trees" (application Ser. No. 09/906,935); and "Methods and Arrangements for Multicasting a Data Stream at Different Data Rates to Groups of Subscribers" (application Ser. No. 09/906,938).

Throughout the present disclosure, various terms are utilized that are generally well-known to those of ordinary skill in the art. However, for the purpose of providing additional clarity, a number of such terms are briefly defined immediately herebelow. (Though one or more of the terms may well be defined elsewhere herein, it is deemed useful at this juncture to gather all of the following terms in one place, to provide a glossary of sorts that may serve, when needed, as a convenient and easily discernible reference point.)

A "data distribution path" is defined as the sequence of routing nodes which a specific message traverses from the moment that it originates in a publisher node to the moment that it arrives in a receiver node.

A "node" is a general vertex in the multicast distribution tree. There are three specific types of nodes in a SAM tree: the publisher node, which is the root of the tree, the intermediate nodes, which are the nodes with child nodes which are not the root node, and the leaf nodes, which are nodes without any children nodes. The term node is used in this embodiment to generally refer to any of type of node in the SAM tree.

As employed herein, the term "package switching operation" is used to refer to the operation performed by intermediate nodes, also called router nodes, in the data distribution path of a given data transmission. This operation involves receiving the data package and then making a decision of where to retransmit it, if necessary. This decision is made utilizing data that is stored in the proximity of the router node, generally referred to as routing tables. After the routing table are consulted, a package switching node will retransmit (switch) a package to either another intermediate router node or the final receiver of the package.

The term "piece wise point to point" is used to describe the way in which the SAM technology exploits the underlying point to point network protocol in multicasting a message to a plurality of receivers. A SAM message originates a the root node and is addressed with the point to point address of either a final receiver node or an intermediate router node. Whenever an intermediate router node receives a SAM message, it will retransmit it to one or more point to point addresses, of either final receivers or intermediate nodes. This operation is repeated until the message finally reaches a final receiver, or leaf node in the SAM tree. Therefore, a single message is transmitted to a variety of receivers utilizing different point to point addresses along the transmission path. It can thus be said that SAM transmissions are always made using the point to point mode of transmission at every step (piece )of the transmission path, and that the transmission pattern is therefore piece wise point to point.

The term "point of divergence" refers to a node in the SAM tree which has more than one descendant node to which it has to route a given message.

The term "point to point" is used to refer to a transmission mode in which a given message is transmitted from a single source (or point) to a single receiver. Typically, communication networks only support point to point protocols, the most prevalently used being the Internet Protocol (IP) and the Asynchronous Transfer Mode (ATM) protocols. Other modes of transmission are possible, such a broadcast and multicast. Such protocol can be implemented extensions of the underlying (basic) point to point protocol.

The term "point to point address" refers to a network address utilized by basic point to point protocol provided by the communications network.

The term "protocol tunneling" refers to a technique which makes possible to transmit a data package encoded by a given protocol in a network which does not offer direct support for the protocol. The technique involves the encapsulation of the data package into a data segment which is addressed utilizing the basic point to point protocol supported by the network. The package is then transmitted from to a node which is able to receive and process it. These two nodes are referred to as the end points of the tunnel. The receiving node is then able decapsulate the original data package and retransmit it further. Eventually, the package arrives at a network which offers native support for the protocol.

A "publisher node" is a node which is a source of a given information. In SAM, messages are multicasted to a plurality of receivers utilizing a distribution tree, named the SAM tree, which is rooted at the publisher node.

The term "predicate" is used to refer to an additional data field used by SAM to extend the addressing capability of an underlying point to point protocol. This field is used by applications to store data which is used to define specific subsets of the information that originates from a publisher node.

The term "router node" is used to refer to a node which retransmits a given data package such that it can reach a specific final destination. The term "package switching node" is synonymous with this term.

"SAM" is an abbreviation for "Subsource Addressing Multicast".

The term "SAM protocol" refers to the collection of methods and operations which are used by source nodes to express interest in the subsets of information published by a given source, and by the source of information to publish message to subsets of subscribers.

The "SAM tree" is a data structure utilized to multicast messages from the node which is the source of the tree. The intermediate nodes (nodes with children) of the SAM tree are nodes which are capable of routing SAM messages to any of their descendants. The leaf nodes (nodes without children) are nodes that are final receivers of SMA messages. It is also possible for an intermediate node to be a final receiver of a SAM message.

The term "shared paths" is used in reference to the intersection of transmission path segments for a message addressed to a plurality of subscribers. In this embodiment this term is used in reference to both point to point and multicast routing paths. A point to point shared transmission path between two receivers of a message occurs when the routing decisions taken by the underlying point to point protocol define paths that traverse the same sequence of routing nodes for some portion of the paths. Similarly, a multicast shared path is an equal sequence of multicast routing nodes in the transmission paths for messages destined for multiple multicast addresses. In the field of multicast communications, performance gains are realized by exploiting common transmission paths, or shared paths, in both the point to point and the multicast package switching infrastructure.

The term "subsource addressing multicast" is used to collectively refer to a set of technologies which make possible for a source of information to multicast messages to any given subset of its receivers. This technology includes the SAM protocol and the SAM tree discussed above.

As employed herein, a "subscriber" is a node which has posted at least one subscriber operation, and a final receiver of SAM messages.

The term "tunneling" refers to the act of deploying a protocol tunnel (described above) for the transmission of a message.

The term "underlying protocol" is used to refer to the basic point to point protocol supported by the communications network.

At least one presently preferred embodiment of the present invention broadly embraces a multicast distribution tree capable of realizing multiple distribution paths. The distribution tree may be referred to as a Subsource Addressing Multicast tree, or a SAM tree. As described herebelow, the SAM tree is capable of realizing optimal distribution paths for any subset of the nodes of a given source which is the root of the tree. The tree is preferably configured such that it can be deployed as an extension of any underlying point to point protocol.

In accordance with at least one presently preferred embodiment of the present invention, the SAM multicast distribution tree is distinguished from other distribution trees because any given intermediate node can propagate a message not only to its direct descendants, but also to any number of indirect descendants. Therefore, in addition to keeping the basic state information which is required from a multicast distribution tree, such as parent and direct descendant information, each intermediate node in the tree also keeps data related to the propagation to indirect descendants. In other words, the SAM multicast tree can be used to propagate messages in a plurality of paths. In actuality, the SAM trees allows for the all possible combinations of data transfer paths between the root node of the tree and all possible subsets of its descendants. The SAM tree can therefore be utilized to support a very fine grained addressing scheme, such as the SAM protocol.

FIG. 1 illustrates a SAM tree and a few of the possible paths for data propagation from the node S0, denoted by the dotted arrows. Not all possible paths are shown, so as not to impair the clarity of the illustration. Each parent node is capable of sending a message directly or via a protocol tunnel to any of its descendants. The collection of all possible subpaths generate a distribution mesh capable of efficiently multicasting messages to any subset of receivers making optimum use of the shared transmission paths among receivers.

The data propagation patterns determined by the SAM propagation tree are preferably such that a message destined for multiple nodes will incur a minimum number of retransmissions. In one embodiment, this is achieved by forcing the retransmissions to occur only at the points of divergence in the propagation path. This will result in the optimal utilization of shared paths among the subsets of receivers of the message. The direct transmission of a message from a parent node to its descendants can be made via a protocol tunnel, which will result in further gains in performance.

Preferably, the SAM tree includes a root node P1, which is the publisher of information, and a set of nodes (e.g., S0–S22) which are either direct or indirect descendants of the root node P1. The descendants of the root node P1 can be either the final destination of notification messages or intermediate router nodes. A router node is a node is capable of forwarding notification messages to other router nodes or subscriber nodes. A subscriber node is a node which is a final destination for a notification message. A router node may be a subscriber node as well as a router node.

As previously mentioned, multicast capability is usually added to a network as an extension of some previously existing point to point protocol. Preferably, the SAM tree is configured such that it makes an optimal use of the existing point to point message switching infrastructure. When a parent node in the SAM tree relays a message to one if its descendants utilizing the descendant's point to point address directly, it is avoiding the overhead of making several package switching operation at each intermediate node in the path from the parent to the descendant.

Since SAM extends the addressing capability of the underlying point to point protocol, it involves two kinds of data switching operations:

i. the basic point to point package switching operation
ii. the extended multicast package switching operation, which is performed by the nodes in the network which function as SAM routers.

The direct addressing capability of the SAM tree results in a savings of both kinds of package switching operations, which makes SAM a very efficient multicast package switching infrastructure.

Preferably, the SAM communication infrastructure keeps specific state information in every node which participates in a SAM network. Accordingly, each node in a SAM network preferably keeps the following state:

i. Point to Point Address of the parent node
ii. Point to Point Address of each child node
iii. SAM distribution lists for any of the subsets of the node's descendants In a preferred embodiment, the distribution lists are identified by a predicate field, which extends the addressing capability of the underlying point to point protocol. This extra field is utilized by the specific application which uses the SAM protocol to identify subsets of receivers of the published information. The utilization of an application specific predicate field as a network address is a unique characteristic embraced herein.

The aforementioned embodiment carries out a preferred implementation of the SAM tree utilizing subscription and notification operations which utilize the predicate field. Here, an implementation utilizing the IP protocol as the underlying point to point protocol is discussed, but it should be understood that any similar implementation utilizing any other underlying protocol will not deviate from the spirit or scope of the present invention.

Preferably, the network addresses in SAM are defined by a pair of the following format:

<source,predicate> where:

i. The address of a source of information is itself expressed as a pair of the format [host address, port number]. The host address conforms to the addressing scheme of the underlying point to point protocol. In a sample implementation using TCP/IP this address can be given in dotted decimal format, or alternatively as a host name which can be mapped into a network address, and the port number refers to a communication port which is bound to the publisher process .

ii. The predicate field is utilized by the subscribers to specify a predicate which is interpreted by the publisher process to select a subset of the information stream.

(Though it is feasible to implement SAM over a variety of network protocols, the present discussion will be limited to implementation based on TCP/IP.)

For example, suppose that the publisher provides an information stream including an integer series which is updated at every second. For the present discussion, this information stream may be labeled "the value of X".

Assume now that a subscriber process wants to receive the current value of X, which is published by node P1 at port 7777, but only if X is greater than 130. In SAM, it is possible to express this specific interest with the following network address:

<P1:7777,"X>130">

In another example, the values of the X series indicate unique identifiers which label data items. Therefore, the subscriber could express the desire to receive updates of an item numbered 12345, published by P1 at port 8888, utilizing the following SAM address:

<P1:8888,"X=12345">

The SAM predicate value is preferably handled as a binary value which extends the IP network address, therefore "refining" the granularity of the addressability. It is therefore possible for subscribers to utilize any value, as long as this value can be understood by the publisher of the information. The routers using the SAM protocol have no semantic understanding of the predicates; they are handled exactly as network addresses. This allows SAM to be utilized by essentially any type of publisher system, even supporting different lengths in the predicate field.

The disclosure now turns to a discussion of a general method for a SAM distribution tree in heterogeneous networks. In the copending and commonly owned U.S. patent application filed concurrently herewith, "Methods and Arrangements for Building a Subsource Address Multicast Distribution Tree Using Network Bandwidth Estimates" (application Ser. No. 09/906,939), a method is proposed for the implementation of SAM message distribution utilizing the basic IP routing infrastructure of a network. That method essentially requires that all router nodes in the network be able to participate in the propagation of bottom up control messages. Though such a method is quite efficient, it is nonetheless restricted to a homogeneous network and requires universal SAM support from all routers. This requirement is easily fulfilled by private networks, but it cannot be deployed in heterogeneous networks, i.e., in networks where some of the router nodes are not SAM capable.

Figure 2:
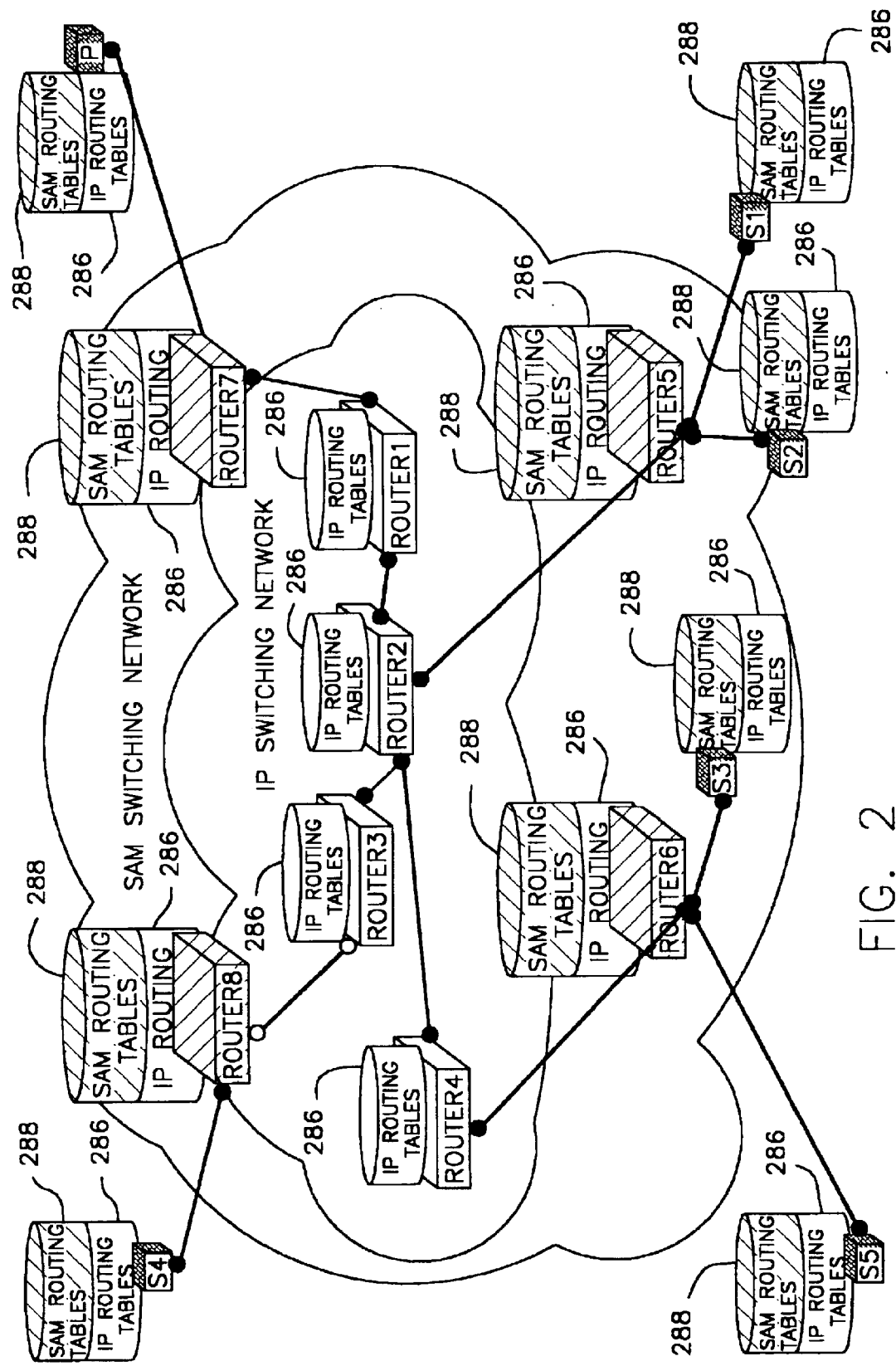
FIG. 2 schematically illustrates a heterogeneous network.

Accordingly, also contemplated in accordance with at least one presently preferred embodiment of the present invention is a method for constructing a SAM message distribution tree, though capable of being deployed in a heterogeneous network. In this vein, FIG. 2 illustrates a typical scenario, in which SAM capable nodes (host nodes P and S1–S5, as well as router nodes Router5–Router8), i.e. which include SAM routing tables 288 as well as IP routing tables 286, are interconnected by one or more networks of non SAM capable router nodes (Router1–Router4), i.e., which do not include SAM routing tables 288. In this deployment, the bottom up messages are protocol-tunneled across the non SAM capable routers.

When the network is composed of routers which are not capable of running a specialized process for subgroup addressing multicast, the resulting message propagation is not likely to be optimal. That is so because the message notification stream will not be able to utilize routers as fork nodes. An since it is likely that the optimal notification stream would demand the use of routers as fork nodes, optimality cannot be achieved. Nevertheless, it is possible to utilize the knowledge of the underlying IP routing topology to determine a sub optimal path for the notification stream, which would minimize the redundancy of the notification messages. (A "sub optimal path" is a path which is less optimal than an optimal path, which itself makes use of the homogenous implementation described previously. The "sub optimal path" is sometimes advantageous since it demands less of the network.) Such a system would actually be an optimal system under the limitations imposed by the non availability of the router nodes.

In "Methods and Arrangements for Building a Subsource Address Multicast Distribution Tree Using Network Bandwidth Estimates", supra, it is discussed that in a network where all routers support the SAM protocol a SAM tree can be built directly from the point to point routing tables. In the case of a heterogeneous network, which includes non SAM capable routers, the SAM message distribution trees are built by an incremental method. This method includes using the publisher node as a coordination point in the tree forming process. The publisher node is contacted initially by any a subscriber node which has interest in receiving information which emanates from the publisher. A subscriber node is only able to receive SAM messages from the publisher after it is inserted in the SAM distribution tree rooted at the publisher, with a node insertion procedure. In this procedure, the subscriber node sends a connect request directly to the publisher, using the publisher node's point to point address. The publisher node then executes a decision process, called node placement, which may involve any other node which is currently in the SAM distribution tree. The node placement procedure determines a position in the SAM distribution tree which will achieve the best possible utilization of the network during the propagation of SAM messages.

Figure 3:
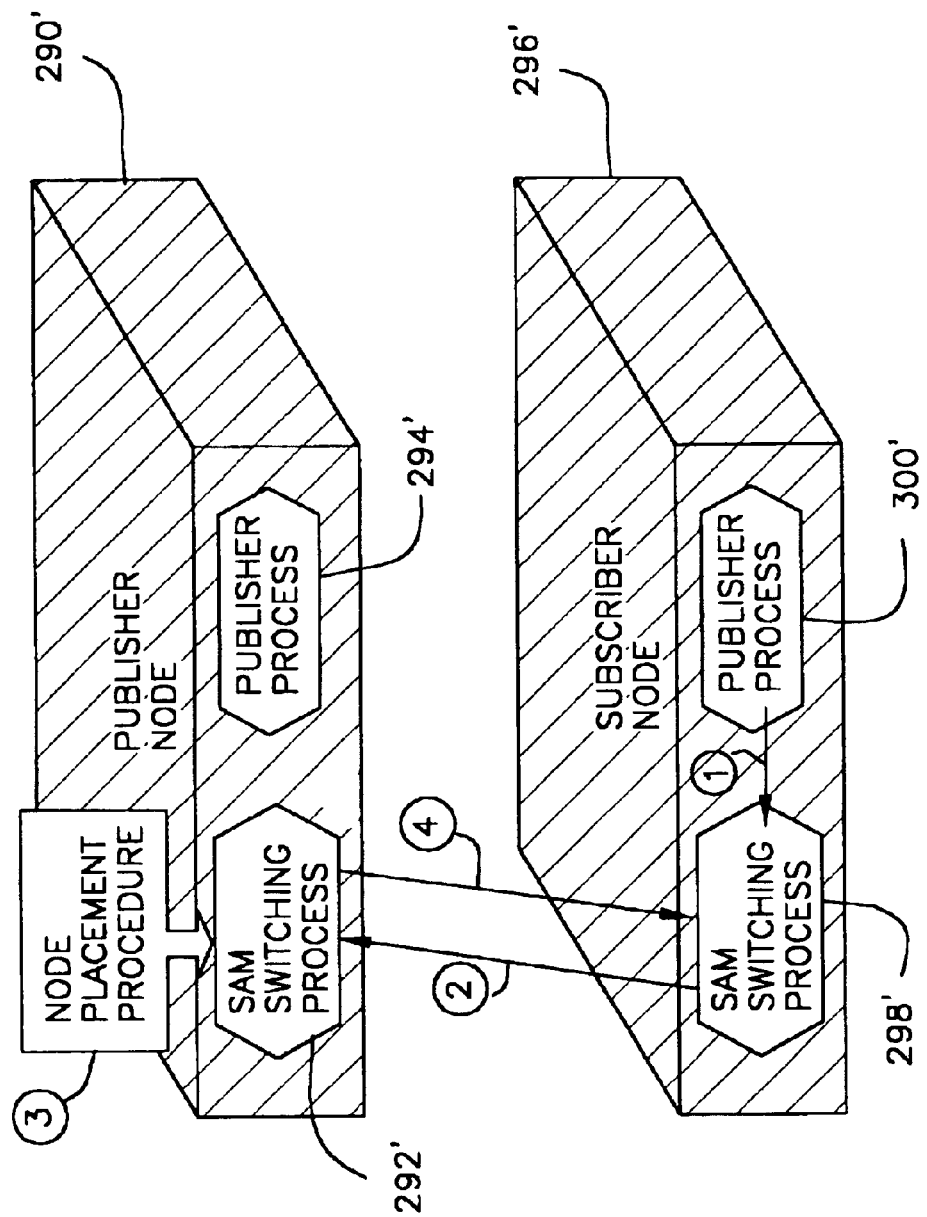
FIG. 3 schematically depicts, in detail, interaction between an arbitrary publisher node and an arbitrary subscriber node.

FIG. 3 illustrates the interaction between an arbitrary subscriber node 296' and an arbitrary publisher node 290' during a node insertion (or node placement) procedure. The subscriber node 292' contains a client process (or subscriber process) 300', which is the consumer of SAM information, and a SAM message switching process 298'. The publisher node 290' contains a publishing process 294' and a similar SAM message switching process 292'. The SAM switching process 298' on the client (subscriber) node 296' will initiate the node insertion procedure when it receives a subscription request containing the point to point address of a publisher node to which it has not yet made any subscription. After the node insertion procedure is completed the subscriber process 300' will be to receive any content distributed by the publisher node 290 (bubble 4). Thus, the following steps preferably take place, corresponding to the bubbled numerals in FIG. 3:

1. The subscriber process 300' on the subscriber node 296' issues a subscribe request. The SAM switching process 298' on the subscriber node 296' detects that this is the first subscription observed for the publisher identified in the subscription message.

2. The SAM switching process 298' of subscriber node 296' issues a connect request to the SAM switching process 292' on the publisher node 290'.

3. The SAM switching process 292' on the publisher node 290' performs the node placement procedure.

4. The SAM switching process 292' on the publisher node 290' informs the SAM switching process 298' on the subscriber node 296' of the address of its parent node in the SAM distribution tree.

It should be noted that initially, the SAM distribution tree includes only a publisher node. The tree is then augmented as subscribers execute the node insertion procedure.

The disclosure now turns to a discussion of a specific node placement procedure in accordance with an embodiment of the present invention, utilizing knowledge of the topology, i.e., layout, of the underlying point to point network. The layout of the point to point communications network can be exported to a SAM switching process in a variety of ways. The switching process is described in further detail in the copending and commonly owned U.S. patent application filed concurrently herewith, "Methods And Apparatus for the Propagation Of Multicast Transmissions In A Communications Network" (application Ser. No. 09/906,928). Herebelow, a specific example is discussed which employs a "trace route" facility. It should be noted that other ways of gathering network layout information are conceivable, and that a similar implementation of the method presently discussed, utilizing any other facility, does not deviate from the spirit or scope of the present invention.

A node placement procedure is directed towards placing a new subscriber node into an existing SAM tree, such that the a minimum number of redundant transmissions are generated in the underlying point to point network during the transmission of SAM notification messages. In a preferred embodiment, a node placement method involves detecting the intersection of point to point paths among the members of the SAM tree, and to place members whose paths have the most in common as adjacent members in the SAM tree. The commonality between two paths is measured according to a pairwise intersection score as described below, while the description of a node placement procedure which utilizes this score follows.

In a node placement procedure in accordance with an embodiment of the present invention, two paths which have a common origin are preferably compared. Since this calculation is done at the publisher node, the origin of the paths is the publisher node. Every time that the publisher node receives a request from a new subscriber to connect to the SAM tree, it will obtain the routing path for point to point messages that originate at the publisher to the new subscriber, and save this calculated path for further use. It will then compare the path intersection score of this path to all the other previously calculated paths to existing subscribers of the SAM tree. The intersection score is given by measuring the size of the longest common prefix counting from the origin which is the publisher node, and then dividing the length of the longest common prefix by the size of the smaller of the two paths.

For example, if letters are utilized to denote node addresses, consider the calculation of the intersection of two paths which start at node x:

P1=[x,a,b,c,d,k,l,m], which has length 7
P2=[x,a,b,c,p,q,r], which has length 6

The longest common prefix is [x,a,b,c], which has length 3. The intersection score of the two paths is therefore 3/6, which can be expressed as 50% (though this is an approximation, as shown below).

It should be noted that one will preferably divide by 6 to calculate the score relative P2, or by 7 if considering score relative to P1. Accordingly, the following normalized formula may be used to result in an absolute score:

$$\text{score}(P1, P2) = \frac{2 * \text{length}(P1 \cap P2)}{\text{length}(P1) + \text{length}(P2)}$$

Using the example described above, the score would result in:

$\text{Score}(P1,P2) = 2*3/(7+6) = 6/13$; which is approx. 50%.

Figure 4:
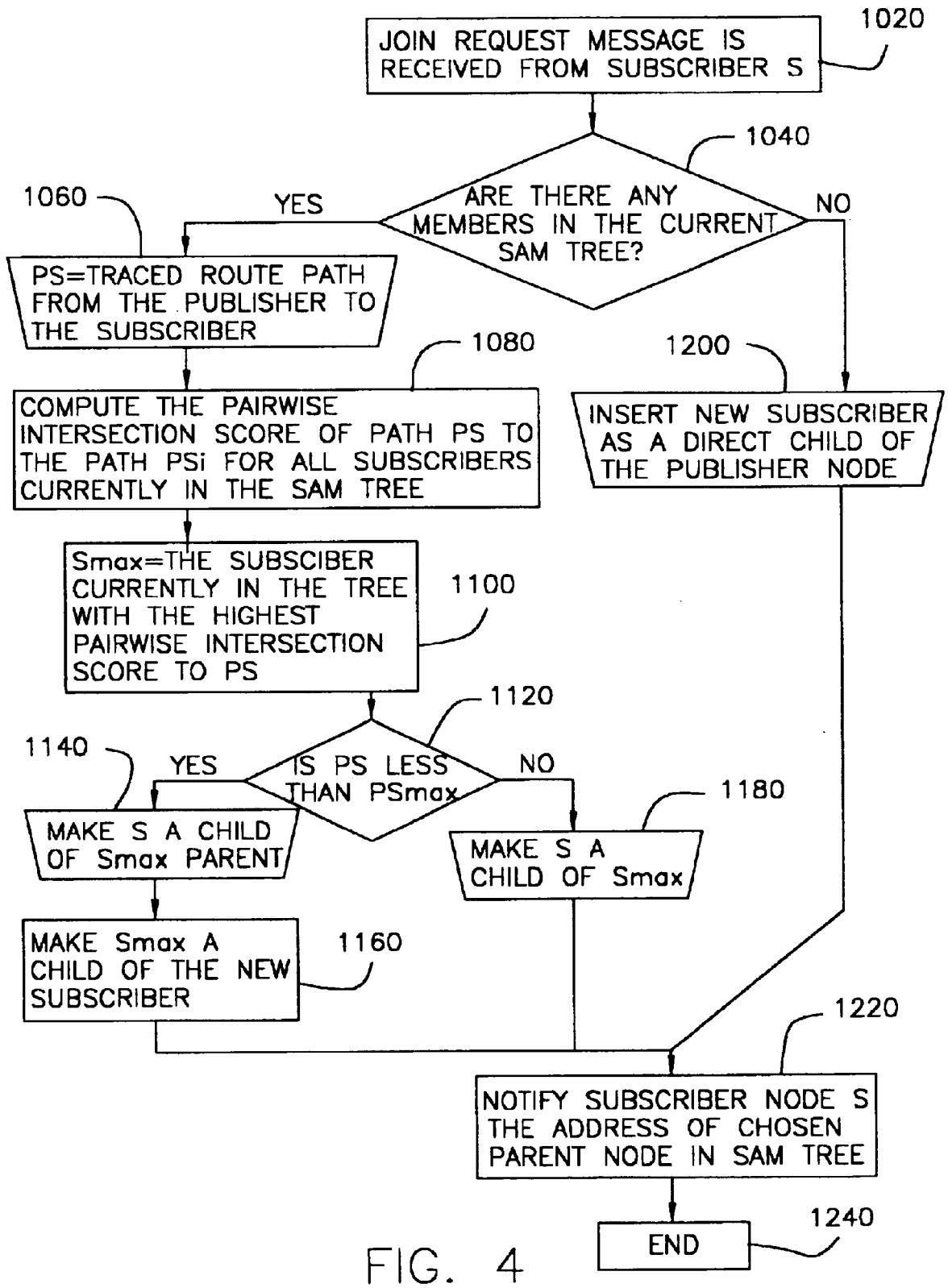
FIG. 4 schematically illustrates a method with which a publisher node builds a SAM distribution tree using a "trace route" facility.

FIG. 4 schematically illustrates a method with which a publisher node builds a SAM distribution tree using the "trace route" facility and the intersection calculation described above. Particularly, at 1020, a "join request" message is received from a subscriber S. At 1040, it is queried as to whether there are any members in the current SAM tree. If "yes", then at 1060 PS is designated as the traced route path from the publisher to the subscriber. Thereafter at 1080, the pairwise intersection score of path PS to the path PSi, for each single subscriber in the SAM tree, is computed.

Generally, P is the publisher node, and S is the newly joining subscriber. Each subscriber already in the tree (that joined before S) is represented as Si (array S indexed by i). A path between the publisher and a subscriber is represented as PS (the path between the publisher and the joining subscriber). PSi is the path between the publisher and subscriber Si. PSmax is the path between the publisher and the subscriber Smax. Smax is the subscriber whose path to the publisher PSmax has the property of yielding the highest intersection score when applied to the path PS than any other subscriber PSi. In other words, the term "max" stands for the index of the particular subscriber such that "max" is the index value for which the score(PS,PSi) is the highest.

At 1100, Smax is designated as the subscriber currently in the tree with the highest pairwise intersection score to PS. At 1120, it is queried as to whether the length of PS is less than the length of PSmax. If yes, then at 1140 S is designated as a child of Smax's parent. Thereafter, at 1160, Smax is designated as a child of the new subscriber. At 1220, the subscriber node is notified of the address of the chosen (designated) parent node in the SAM tree. The process ends at 1240.

If the answer to the query at 1120 is "no", then at 1180 S is designated as a child of Smax. The process then continues at 1220.

If the answer to the query at 104 is "no", then at 120 a new subscriber is "inserted" as a "direct" child of the publisher node. The process then continues at 122.

It is to be understood that the present invention, in accordance with at least one presently preferred embodiment, includes an arrangement for designating a node as a publisher node, an arrangement for designating at least one node as at least one existing subscriber node, an arrangement for designating one of the nodes as a joining subscriber node, an arrangement for ascertaining a path between the publisher node and the joining subscriber node, an arrangement for ascertaining each path between the publisher node and each existing subscriber node, an arrangement for comparing the path between the publisher node and the joining subscriber node with each path between the publisher node and each existing subscriber node, and an arrangement for establishing the joining subscriber node as a child of another node. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of facilitating the further development of a distribution tree among nodes in a distributed network, said method comprising the steps of:

designating one of the nodes as a publisher nodes:
designating at least on node as at least one existing subscriber node, the at least one existing subscriber node and the at least one publisher node forming an existing distribution tree;
designating one of the nodes as a joining subscriber node;
ascertaining a path between said publisher node and said joining subscriber node;
ascertaining each path between said publisher node and each existing subscriber node;
comparing the path between said publisher node and said joining subscriber node with each path between said publisher node and each existing subscriber node; and
establishing said joining subscriber node as a child of an existing subscriber based on said comparing step.

2. The method according to claim 1, wherein said comparing step comprises determining a pairwise intersection score of the path between said publisher node and said joining subscriber node with respect to each path between said publisher node and each existing subscriber node.

3. The method according to claim 2, wherein said establishing step comprises ascertaining the node in the existing distribution tree with the highest pairwise intersection score with respect to the path between said publisher node and said joining subscriber node.

4. The method according to claim 3, wherein said establishing step further comprises establishing said joining subscriber node as a child of the node with the highest pairwise intersection score if the length of the path between said publisher node and said joining subscriber node is not less than the length of the path between said publisher node and the node with the highest pairwise intersection score.

5. The method according to claim 3, further comprising the steps of:

designating one of nodes as the existing parent of the node with the highest pairwise intersection score;

said establishing step further comprising establishing said joining subscriber node as a child of said existing parent if the length of the path between said publisher node and said joining subscriber node is not less than the length of the path between said publisher node and the node with the highest pairwise intersection score.

6. The method according to claim 3, further comprising the step of establishing the node with the highest pairwise intersection score as a child of said joining subscriber node.

7. An apparatus for facilitating the further development of a distribution tree among nodes in a distributed network, said apparatus comprising:

an arrangement for designating one of the nodes as a publisher node;

an arrangement for designating at least one node as at least one existing subscriber node, the at least one existing subscriber node and the at least one publisher node forming an existing distribution tree;

an arrangement for designating one of the nodes as a joining subscriber node;

an arrangement for ascertaining a path between said publisher node and said joining subscriber node;

an arrangement for ascertaining each path between said publisher node and each existing subscriber node;

an arrangement for comparing the path between said publisher node and said joining subscriber node with each path between sad publisher node and each existing subscriber node: and an arrangement for establishing said joining subscriber node as a child of an existing subscriber based on the comparison of paths.

8. The apparatus according to claim 7, wherein said comparing arrangement is adapted to determine a pairwise intersection score of the path between said publisher node and said joining subscriber node with respect to each path between said publisher node and each existing subscriber node.

9. The apparatus according to claim 8, wherein said establishing arrangement is adapted to ascertain the node in the existing distribution tree with the highest pairwise intersection score with respect to the between said publisher node and said joining subscriber node.

10. The apparatus according to claim 9, wherein said establishing arrangement is further adapted to establish said joining subscriber node as a child of the node with the highest pairwise intersection score if the length of the path between said publisher node and said joining subscriber node is not less than the length of the path between said publisher node and the node with the highest pairwise intersection score.

11. The apparatus according to claim 10, further comprising:

an arrangement for designating one of the nodes as the existing parent of the node with the highest pairwise intersection score;

said establishing arrangement being further adapted to establish said joining subscriber node as a child of said existing parent if the length of the path between said publisher node and said joining subscriber node is less than the length of the path between said publisher node and the node with the highest pairwise intersection score.

12. The apparatus according to clam 11, further comprising an arrangement for establishing the node with the highest pairwise intersection score as a child of said joining subscriber node.

13. A program storage device readable by machine, tangibly embodying a program of instructions executable by the machine to perform method steps for facilitating the further development of a distribution tree among nodes in a distributed network, said method comprising be steps of:

designating one of the nodes as a publisher node;

designating at least one node as at least one existing subscriber node, the at least one existing subscriber node and the at least one publisher node forming an existing distribution tree, designating one of nodes as a joining subscriber node;

ascertaining a path between said publisher node and said joining subscriber node;

ascertaining each path between said publisher node and each existing subscriber node;

comparing the path between said publisher node and said joining subscriber node with each path between said publisher node and each existing subscriber node; and establishing said joining subscriber node as a child of an existing subscriber based on said comparing step.

* * * * *

UNITED STATES PATENT AND TRADEMARK OFFICE
CERTIFICATE OF CORRECTION

| | |
|---|---|
| PATENT NO. | : 6,947,392 B2 |
| APPLICATION NO. | : 09/906936 |
| DATED | : September 20, 2005 |
| INVENTOR(S) | : Novaes |

It is certified that error appears in the above-identified patent and that said Letters Patent is hereby corrected as shown below:

Column 13, Line 29, "node:" should read --node;--

Column 14, Line 19, "clam" should read --claim--

Column 14, Line 27, "be" should read --the--

Column 14, Line 32, "tree," should read --tree;--

Column 14, Line 34, "one of nodes" should read --one of the nodes--

Signed and Sealed this

Third Day of April, 2007

JON W. DUDAS
*Director of the United States Patent and Trademark Office*